B. A. REXFORD.
AUTOMOBILE PULLER.
APPLICATION FILED FEB. 8, 1919.
1,301,743.  Patented Apr. 22, 1919.
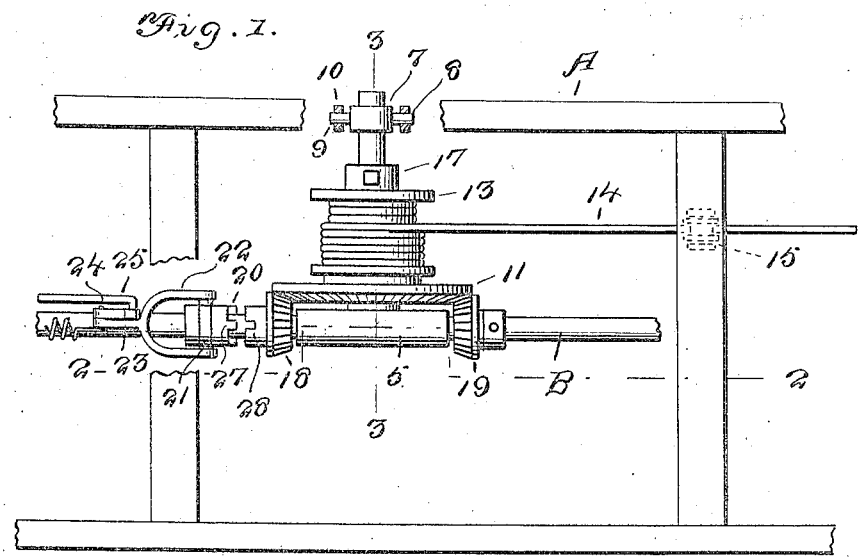
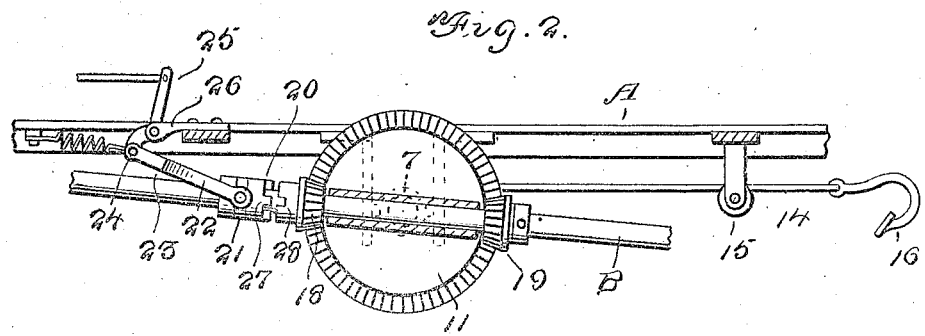
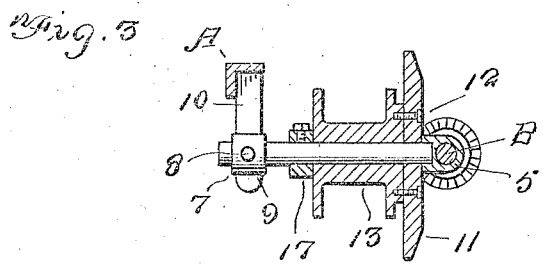
Witnesses
E. R. Ruppert
Inventor
B. A. Rexford
By Victor J. Evans
Attorney

UNITED STATES PATENT OFFICE.

BENJAMIN A. REXFORD, OF ALTON, ILLINOIS.

AUTOMOBILE-PULLER.

1,301,743.  Specification of Letters Patent. Patented Apr. 22, 1919.

Application filed February 8, 1919. Serial No. 275,833.

*To all whom it may concern:*

Be it known that I, BENJAMIN A. REXFORD, a citizen of the United States, residing at Alton, in the county of Madison and State of Illinois, have invented new and useful Improvements in Automobile-Pullers, of which the following is a specification.

This invention relates to automobile extractors or pullers and has for its object the provision of a device permanently associated with the drive shaft of a motor vehicle and provided with manually controlled means whereby it may be operatively connected with the drive shaft for rotation of a drum having connected therewith a cable provided upon its free end with attaching means for connection with a rigid object, rotation of the drum resulting in winding thereon of the cable and consequent movement of the vehicle.

An important object is the provision of a device of this character which is formed as an attachment and which is so constructed that it may be placed upon motor vehicles of different makes, the drum shaft bearing being so constructed as to permit the drum shaft to be disposed at various angles with respect to the frame of the vehicle depending upon the distance below the frame at which the drive shaft is disposed, the other end of the drum shaft being carried by a bearing mounted on the drive shaft in revoluble relation therto.

Another object is the provision of a device of this character including a hand lever disposed within convenient reach of the operator of the vehicle and connected with a clutch member whereby a train of gears may be set in motion for imparting movement to the drum shaft.

Another object is the provision of a device of this character which is permanently associated with a motor vehicle whereby it is always ready for use without the necessity of any great manipulation of the parts.

An additional object is the provision of a device of this character which will be comparatively simple and inexpensive in manufacture, highly efficient and durable in use, and a general improvement in the art.

With the above and other objects and advantages in view, the invention consists in the details of construction to be hereinafter more fully described and claimed, and illustrated in the accompanying drawings in which:—

Figure is a plan view of a portion of the frame of a motor vehicle, showing my device in position thereon and associated with the drive shaft.

Fig. 2 is a longitudinal sectional view on the line 2—2 of Fig. 1 and

Fig. 3 is a cross sectional view on the line 3—3 of Fig. 1.

Referring more particularly to the drawings the numeral A designates a portion of the frame of a motor vehicle and B designates the drive shaft. In carrying out my invention, I provide a bearing member, in the form of a cylindrical sleeve, 5 which is disposed upon the drive shaft B at some convenient portion in its length in revoluble relation thereto. Extending from the bearing member 5 is a stub shaft which has its outer end disposed within the bearing sleeve 7 from the sides of which extend trunnions 8 engaged rotatably within ears 9 formed on brackets 10 secured upon one side bar of the frame A. By this construction it will be seen that the free end of the stub shaft 6 will be properly supported regardless of the distance of the drive shaft B below the plane of the frame A.

Rotatable upon the stub shaft 6 is a relatively large gear 11, which is secured as shown at 12 to a drum 13 to which is connected one end of a cable 14 trained over a suitable guide pulley 15 mounted upon the frame A and carrying upon its free end a hook member 16. The bevel gear 11 and drum 13 are prevented from longitudinal movement upon the stub shaft 6 by means of a suitable stop collar 17. Rotatably mounted upon the drive shaft B at the ends of the bearing member 5 are relatively small bevel gears 18 and 19 which always mesh with the bevel gear 11.

In order that rotation of the drive shaft D may operate to rotate the drum 13, I provide a clutch member 20 splined upon the drive shaft B and provided with a groove 21 within which is engaged a fork 22 formed on one end of an arm 23 which has its other end pivotally connected as shown at 24 with an operating lever 25 pivoted upon a rigid bracket 26 and disposed within convenient reach of the driver of the vehicle. The clutch member 20 is provided with clutch faces 27 engageable with clutch faces 28 on the gear 18.

The operation of the device is as follows:—

Assuming that the motor vehicle is stuck in the mud, in order to move the vehicle, it is first necessary that the cable 14 be unwound from the drum 13 and the hook 16 be engaged upon some rigid object, such as a tree or the like, after which the operator moves the lever 25 forwardly, whereupon the clutch member 20 will be shifted longitudinally of the drive shaft B and the clutch members 27 and 28 will be engaged. The motor being in operation, the transmission clutch of the vehicle is thrown in slowly whereupon the drive shaft B will be rotated carrying with it the clutch member 20. As the bevel gear 18 will then rotate with the clutch member 20 the bevel gear 11 will also be rotated, carrying with it the drum 13. Rotation of the drum 13 will cause the cable 14 to be wound thereupon which will result in pulling the vehicle along the ground. The gear 19 is only an idler to serve as a guide for steadying the gear 11 during its rotation.

From the foregoing description and a study of the drawings, it will be apparent that I have thus provided an extremely simple and efficient pulling device which may be readily thrown into or out of operation as desired, and which will efficiently perform all the operations for which it is intended.

While I have herein shown and described the preferred embodiment of the invention, it will of course be readily understood that I reserve the right to make such changes in the form, construction and arrangement of parts as will not depart from the spirit of the invention nor the scope of the subjoined claims.

I claim:—

1. In combination with the frame and drive shaft of a motor vehicle, a bearing member revolubly associated with the drive shaft, a stub shaft extending from said bearing member, a pivoted bearing member receiving the free end of said stub shaft and connected with said frame, a drum rotatable upon said stub shaft, a bevel gear secured to said drum, and rotatable therewith, a bevel gear revoluble upon said drive shaft and meshing with said first named gear, manually controlled means for locking said second named gear for rotation with said drive shaft, and a cable connected at one end with said drum and having its other end provided with attaching means.

2. An automobile attachment comprising a bearing member revolubly associated with the drive shaft, a stub shaft extending from said bearing member, brackets secured upon the frame of the automobile and including apertured ears, the sleeve disposed upon the free ends of said stub shaft and provided with trunnions engaged within said apertured ears, drums revoluble upon said stub shaft, a beveled gear secured to said drum, a beveled gear rotatable upon said drive shaft and meshing with said first named gear, said second named gear being provided with clutch faces, a clutch member splined upon said drive shaft and adapted for engagement with such clutch faces, means for shifting said clutch member, and a cable secured at one end to said drum and having its other end provided with attaching means.

In testimony whereof I affix my signature.

BENJAMIN A. REXFORD.

Copies of this patent may be obtained for five cents each, by addressing the "Commissioner of Patents, Washington, D. C."